(12) United States Patent
Arai

(10) Patent No.: US 7,741,423 B2
(45) Date of Patent: Jun. 22, 2010

(54) HIGHLY OXYGEN PERMEABLE POLYMER

(75) Inventor: Masatoshi Arai, Annaka (JP)

(73) Assignee: Shin-Etsu Chemical Co, Ltd., Tokyo (JP)

( * ) Notice: Subject to any disclaimer, the term of this patent is extended or adjusted under 35 U.S.C. 154(b) by 515 days.

(21) Appl. No.: 11/785,691

(22) Filed: Apr. 19, 2007

(65) Prior Publication Data

US 2007/0249796 A1 Oct. 25, 2007

(30) Foreign Application Priority Data

Apr. 20, 2006 (JP) ............................. 2006-117077

(51) Int. Cl.
 C08F 30/08 (2006.01)
 C08F 130/08 (2006.01)
(52) U.S. Cl. ...................... 526/279; 526/280
(58) Field of Classification Search ................. 526/279, 526/280
 See application file for complete search history.

(56) References Cited

U.S. PATENT DOCUMENTS 5,264,606 A * 11/1993 Moloy et al. ................. 556/482
6,372,020 B2 4/2002 Hong et al.

FOREIGN PATENT DOCUMENTS

| JP | 63-277211 A | 11/1988 |
|---|---|---|
| JP | 1-294681 A | 11/1989 |
| JP | 4-88004 A | 3/1992 |
| JP | 5-261260 A | 10/1993 |
| JP | 5-285216 A | 11/1993 |
| JP | 8-13823 B2 | 2/1996 |
| JP | 8-198881 A | 8/1996 |
| JP | 2003-252881 A | 9/2003 |
| WO | WO-97/32913 A1 | 9/1997 |

OTHER PUBLICATIONS

Karlou-Eyrisch et al., "Ethenolysis of Silicon containing cycloolefins", Journal of Organometallic Chemistry, 606, 3-7(2000).*
Chevalier et al., "Ring-opening olefin metathesis polymerization (ROMP) as a potential cross-linking mechanism for siloxane polymers", Journal of Inorganic and Organometallic Polymers, 9(3), 151-164(1999).*
Partial English Translation of DE 41 28 932 A1.

* cited by examiner

*Primary Examiner*—Ling-Siu Choi
(74) *Attorney, Agent, or Firm*—Birch, Stewart, Kolasch & Birch, LLP

(57) ABSTRACT

A polymer having a number average molecular weight (Mn) of from 10,000 to 5,000,000, as determined by gel permeation chromatography and reduced to polystyrene, and repeating units represented by the following formula (1):

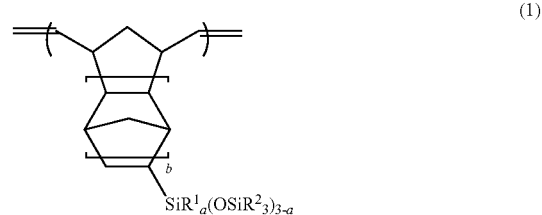

(1)

wherein $R^1$ and $R^2$ may be the same with or different from each other and are substituted or unsubstituted alkyl groups having 1 to 12 carbon atoms, a is a number of 0, 1, 2 or a mixture thereof, and b is a number of 0, 1, 2 or a mixture thereof.

6 Claims, 2 Drawing Sheets

HIGHLY OXYGEN PERMEABLE POLYMER

CROSS REFERENCE

This application claims benefit of Japanese Patent application No. 2006-117077 filed on Apr. 20, 2006, the contents of which are hereby incorporated by reference.

FIELD OF THE INVENTION

The present invention relates to an alicyclic polymer, specifically to an alicyclic polymer having a specific organopolysiloxane as a pendant group. The polymer has excellent gas permeability, particularly oxygen gas permeability.

DESCRIPTION OF THE PRIOR ART

In these days, air conditioners are indispensable to provide comfortable environment to homes and automobiles. Usually, a space where an air conditioner is used is highly hermetically sealed for high energy efficiency. When a man continues working in such a sealed space, he may suffer from oxygen deficiency, leading to decrease in operating efficiency or even to drowsiness, particularly in an automobile, which may causes safety problem. To avoid the problem, an air conditioner provided with an oxygen enrichment membrane permeating oxygen more than nitrogen has been developed, but satisfactory performance has not yet been attained.

It is known that an organosiloxane has good oxygen permeability. However, the organosiloxane itself is not mechanically strong enough for practical use. Copolymers of an organosiloxane are known, for example, a copolymer with polycarbonate from Japanese Patent Application Laid-Open No. H05-261260 and a polysiloxane-aromatic polyamide block copolymer from Japanese Patent Application Laid-Open No. H05-285216. Syntheses of these copolymers, however, are very complicated, and long-term stability of these copolymers is not so good due to hydrolysis. Polymers having organosilicon substituents are also known, for example, a silicon-containing polystyrene from Japanese Patent Application Laid-Open No. H04-88004, a silicon-containing polystilbene from Japanese Patent Application Laid-Open No. H08-198881, and a silicon-containing cellulose from Japanese Patent Application Laid-Open No. 2001-79375. However, none of them meet all the requirements of high oxygen permeability, oxygen selectivity over nitrogen, and mechanical strength.

SUMMARY OF THE INVENTION

An object of the present invention therefore is to provide a polymer which is easy to produce industrially, and has high gas permeability and oxygen gas selectivity over nitrogen gas.

Thus, the present invention is a polymer having a number average molecular weight (Mn) of from 10,000 to 5,000,000, as determined by gel permeation chromatography and reduced to polystyrene, and repeating units represented by the following formula (1):

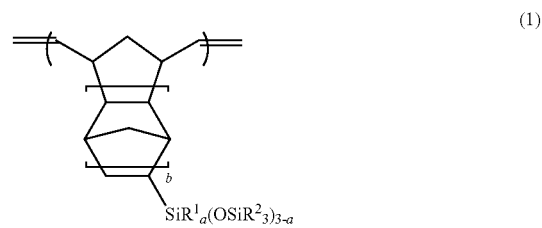

(1)

wherein $R^1$ and $R^2$ may be the same with or different from each other and are substituted or unsubstituted alkyl groups having 1 to 12 carbon atoms, a is a number of 0, 1, 2 or a mixture thereof, and b is a number of 0, 1, 2 or a mixture thereof.

The aforesaid polymer of the present invention can be prepared easily by ring-opening polymerization of a cycloolefin, i.e., metathesis polymerization. The polymer has good film-forming property. The film obtained has high gas permeability and oxygen selectivity over nitrogen.

DESCRIPTION OF THE PREFERRED EMBODIMENTS

Figure 1:
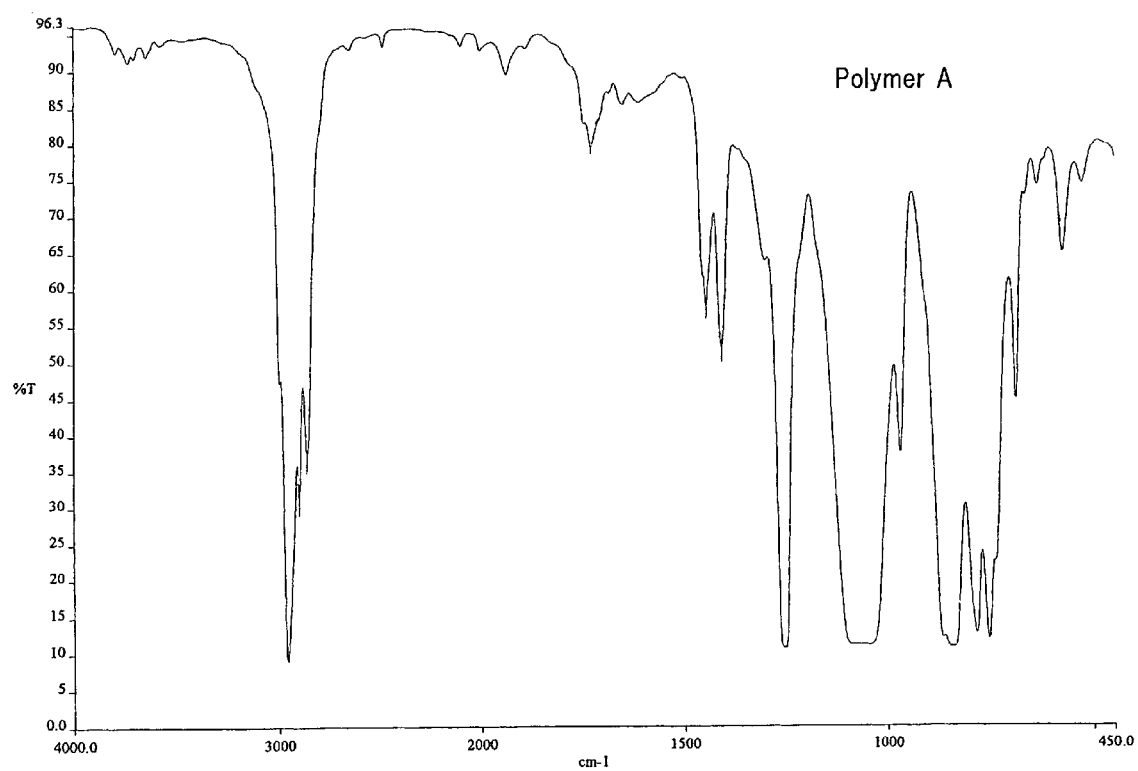
FIG. 1 is an IR spectrum of Polymer A prepared in Example 1.

In the above formula (1), examples of $R^1$ and $R^2$ include methyl, ethyl, n-propyl, butyl, pentyl groups and fluorinated groups thereof, among which methyl group is preferred.

The number, a, is 0, 1, 2 or a mixture thereof. That is, the polymer may have a mixture of a repeating unit with a being 0 and the unit with a being 1. Preferably, a is 0, 1, or a mixture thereof, and most preferably 0, because of good oxygen permeability. The number, b, is 0, 1, 2 or a mixture thereof. Preferably, b is 0, 1, or a mixture thereof, and most preferably 0, because of good polymerization property.

The aforesaid repeating unit can be derived from the organosilicon compound represented by the following formula (3):

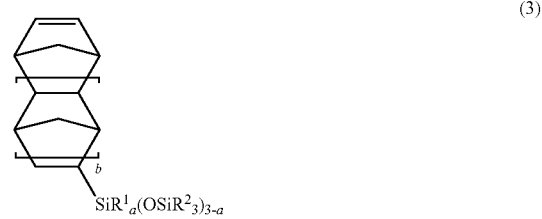

(3)

wherein $R^1$, $R^2$, a and b are as defined above.

Examples of the organosilicon compound of the formula (3) are as shown below, wherein Me represents a methyl group. A mixture of these compounds may be used.

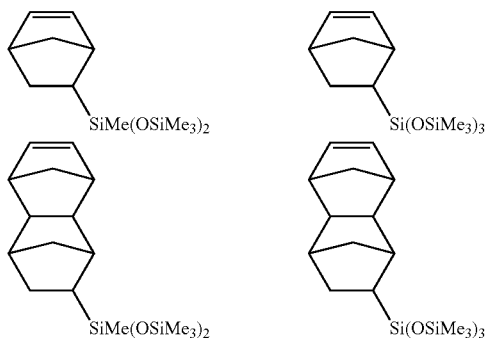

The organosilicon compound can be prepared by subjecting the polysiloxane of the following formula having a vinyl group and cyclopentadiene to Diels-Alder reaction. Details of the preparation will be described later in Examples.

The polymer of the present invention can be obtained by subjecting the organosilicon compound to a metathesis polymerization. The metathesis polymerization can be performed in a usual manner, for example, by dissolving monomers in an aromatic hydrocarbon solvent such as toluene and xylene, and polymerizing the monomers in the presence of a polymerization catalyst at a temperature of from 40 to 60° C. and at an atmospheric pressure in nitrogen atmosphere while stirring. As the polymerization catalyst, a generally used radical polymerization catalyst can be used, for example, various kinds of peroxides, Ziegler catalysts, metallocene catalysts, and carbene-type catalysts such as tungsten catalyst or ruthenium catalyst. Preferably, Grubbs catalyst 1st Generation, Grubbs catalyst 2nd Generation, or Hoveyda-Grubbs catalyst is used. The catalyst may be used in an amount of from 1 to 1000 ppm, preferably from 5 to 500 ppm based on a weight of the monomer. With less than 5 ppm of the catalyst, the polymerization proceeds impractically slowly. On the other hand, with more than 500 ppm of the catalyst, production costs would be high and moreover scission reaction of a polymer may occur, causing gelation of the polymer.

In addition to the organosilicon compound of the formula (3), another olefin compound may be used as a co-monomer which is subjected to an addition polymerization or metathesis polymerization. Examples of the olefin compound include aliphatic olefins such as ethylene and propylene; norbornenyl alicyclic olefins; aromatic olefins such as styrene, α-methylstyrene and stilbene; and acrylic acid esters such as methyl acrylate and butyl methacrylate. Preferably, the alicyclic organic compound which can ring-open to polymerize, for example, the one represented by the following formula (4) is used. By using the organic compound, a polymer having, in addition to the repeating units of the formula (1), the repeating unit of the formula (2) can be prepared:

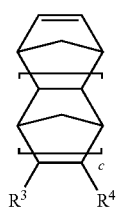

(4)

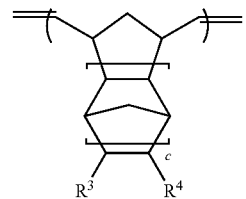

(2)

wherein $R^3$ and $R^4$ may be the same with or different from each other and are hydrogen atoms or monovalent organic groups, for example, alkyl, aryl, or alkylalkoxycarbonyl groups each having 1 to 7 carbon atoms. Preferably, $R^3$ and $R^4$ are hydrogen atoms or methyl groups because of good oxygen permeability. The number, c, is 0, 1, 2 or a mixture thereof. For the reason of good polymerization property, c is preferably 0, 1 or a mixture thereof, among which 0 is most preferred.

Examples of the alicyclic organic compound of the formula (4) are as shown below.

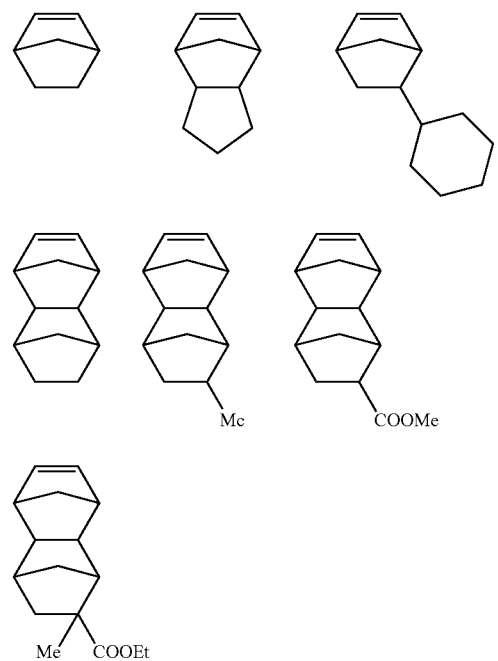

An amount of the co-monomer to be used can be varied depending on an intended application of the polymer. For an oxygen enrichment membrane application and oxygen permeability, the co-monomer may be used in an amount of 0 to 2.0 parts by weight per 100 parts by weight of the compound of the formula (3). Polymerization catalyst and conditions may be the same with those employed when no co-monomer is used.

The polymer of the present invention has a number average molecular weight (Mn) of from 10,000 to 5,000,000, preferably from 50,000 to 500,000, as determined by gel permeation chromatography (GPC) using polystyrene standards. A polymer having a Mn below the aforesaid lower limit tends to lack sufficient mechanical strength, and the one with a Mn above the aforesaid upper limit tends to lack film-forming property.

EXAMPLES

The present invention will be explained with reference to the following Examples, but not limited thereto.

Preparation Example 1

Preparation of Monomer

In a 100 ml of a reactor, 13 g (0.10 mol) of dicyclopentadiene, and 50 g (0.20 mol) bistrimethylsiloxy-methylvinylsilane were placed which were subjected to a reaction at a temperature of from 160 to 175° C. for 4 hours under nitrogen gas flow. The reaction mixture obtained was subjected to vacuum distillation to obtain 37 g of a fraction at a temperature of from 97 to 102° C. and at 9 mm Hg. The fraction had a refractive index ($n_D^{25}$) of 1.444. Structural analyses of the fraction with a $^1$H-NMR spectrometer, LAMBDA LA-300W, ex JEOL Ltd., and a FT-IR spectrometer, Spectrum One, ex PerkinElmer Inc., and quantitative analysis by gas chromatography based on a peak area ratio, as determined with a gas chromatograph, GC-14B, ex Shimadzu Co., of the fraction found that the fraction was a mixture of 89 mol % of the following compound,

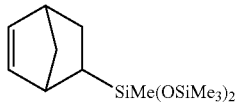

and 11 mol % of the following compound.

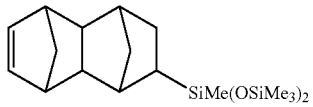

The fraction obtained will be hereinafter referred to as Monomer Mixture A.

Preparation Example 2

Preparation of Monomer

In a 500 ml of a reactor, 132 g (1.00 mol) of dicyclopentadiene, and 322 g (1.00 mol) of tristrimethylsiloxy-vinylsilane were placed which were subjected to a reaction at a temperature of from 160 to 1750° C. for 4 hours under nitrogen gas seal. The reaction mixture obtained was subjected to vacuum distillation to obtain 220 g of a fraction at a temperature of from 118 to 120° C. and at 5 mm Hg. Structural analyses of the fraction with a $^1$H-NMR spectrometer, LAMBDA LA-300W, ex JEOL Ltd., and a FT-IR spectrometer, Spectrum One, ex PerkinElmer Inc., and quantitative analysis by gas chromatography based on a peak area ratio, as determined with a gas chromatograph, C-14B, ex Shimadzu Co., of the fraction found that the fraction was a mixture of 95% of the following compound,

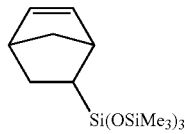

and 5% of the following compound.

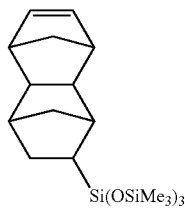

The fraction obtained will be hereinafter referred to as Monomer Mixture B.

Example 1

In a Schlenk flask provided with a three way cock, 4.1 mg (0.005 mmol) of a Grubbs catalyst 1st Generation (Ru catalyst) was placed and the flask was purged with Ar (or $N_2$) gas. To the flask, 5 ml of toluene was added to make a solution of the catalyst and then the flask was put in an oven kept at 40° C. Separately, a 100 ml eggplant type flask provided with a stirrer and a three way cock was purged with Ar (or $N_2$) gas, in which 1.57 g (5.0 mmol) of Monomer Mixture A prepared in Preparation Example 1 and 45 ml of toluene were placed to prepare a solution of the monomer mixture. After stirring the solution to uniformly disperse the monomer mixture, the eggplant type flask was put in the oven kept at 40° C. When a temperature of the monomer solution reached to about 40° C., the Schlenk flask and the eggplant type flask were taken out from the oven. To the monomer solution, the catalyst solution was added via a syringe while stirring. After the catalyst solution was uniformly mixed with the monomer solution, the eggplant type flask was put in the oven. Twenty minutes later, 1 ml of ethyvinylether was added to the eggplant type flask to stop polymerization and stirred for 5 minutes. Subsequently, the solution in the eggplant type flask was slowly dropped in 100 ml of methanol while stirring. A polymer was precipitated which was then isolated by filtration and dried. The polymer obtained, hereinafter referred to as Polymer A, weighed 1.5 g, corresponding to a reaction yield of 96%. The polymer had a Mn of 114,300, and a Mw/Mn of 2.74, as determined with a gel permeation chromatograph, Chromatography 10A series, ex Shimadzu Co., using polystyrene standards. An IR spectrum of Polymer A is as shown in FIG. 1.

Example 2

Figure 2:
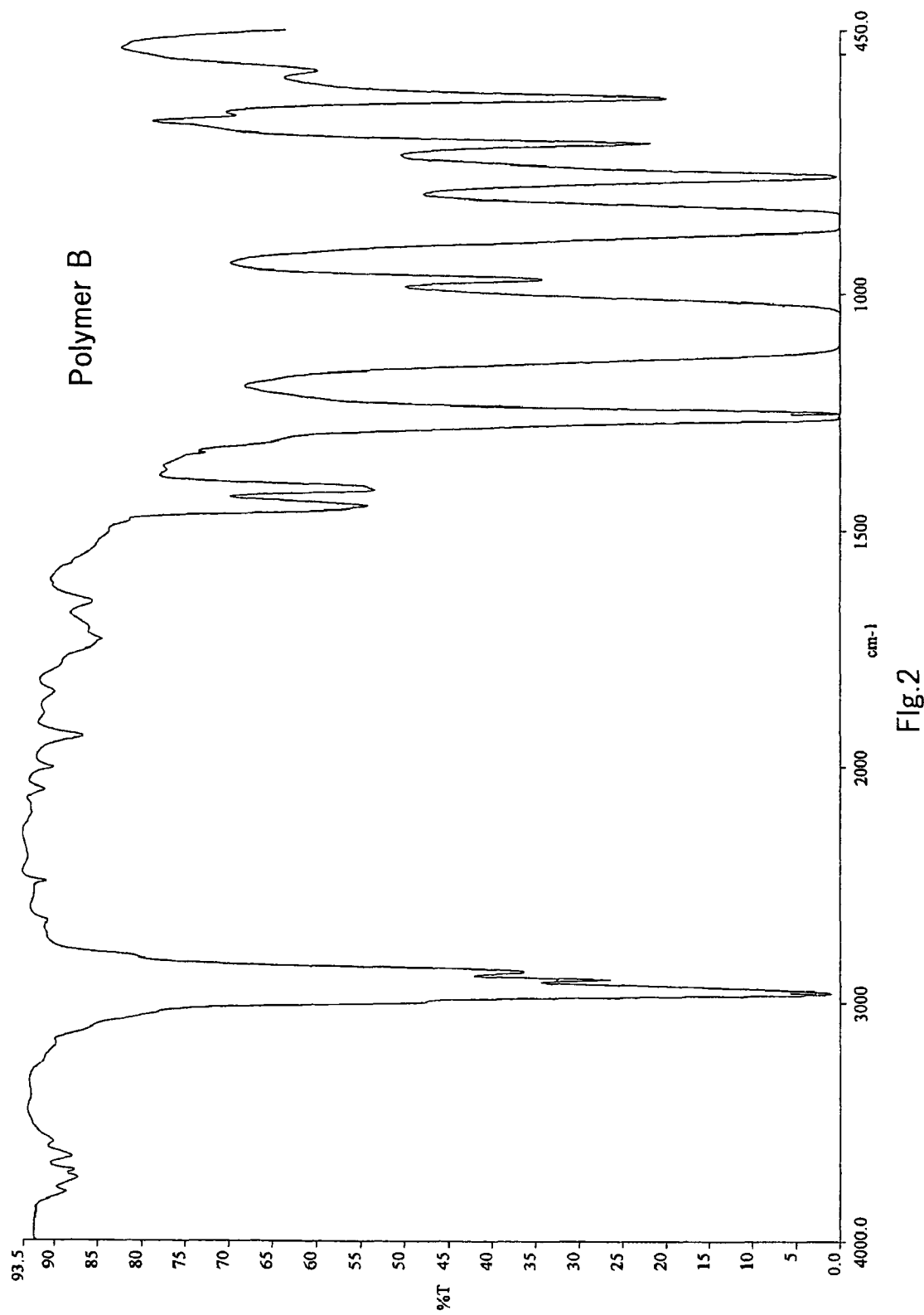
FIG. 2 is an IR spectrum of Polymer B prepared in Example 2.

A polymer was prepared in the same manner as in Example 1 except that 1.94 g (5.0 mmol) of Monomer Mixture B was used in place of Monomer Mixture A. The polymer obtained, hereinafter referred to as Polymer B, weighed 1.9 g, corresponding to a reaction yield of 96%. The polymer had a Mn of 123,300, and a Mw/Mn of 3.96, as determined with a gel permeation chromatograph, Chromatography 10A series, ex Shimadzu Co. using polystyrene standards. An IR spectrum of Polymer B is as shown in FIG. 2.

Example 3

A polymer was prepared in the same manner as in Example 1 except that 1.0 g (2.6 mmol) of Monomer Mixture B and 11.0 g of tetracyclo[6.2.1.1$^{3,6}$.0$^{2,7}$]dodeca-4-ene of the following formula:

was used in place of Monomer Mixture A. The polymer obtained, hereinafter referred to as Polymer C, weighed 1.9 g, corresponding to a reaction yield of 96%. The polymer had a Mn of 156,000, and a Mw/Mn of 3.12, as determined with a gel permeation chromatograph, Chromatography 10A series, ex Shimadzu Co. using polystyrene standards.

Comparative Example 1

A polymer was prepared in the same manner as in Example 1 except that 2.0 g (21 mmol) of 2-norbornene, which lacks siloxane moiety, was used in place of Monomer Mixture A. The polymer obtained, hereinafter referred to as Polymer D, weighed 1.8 g, corresponding to a reaction yield of 90%. The polymer had a Mn of 132,000, and a Mw/Mn of 3.12, as determined with a gel permeation chromatograph, Chromatography 10A series, ex Shimadzu Co. using polystyrene standards.

Preparation of Membranes

Each of the Polymer A, B, C and D prepared in Example 1, 2, 3 and Comparative Example 1, respectively, was dissolved in hexane. A cast film was prepared by casting the hexane solution on a glass plate and evaporating the hexane.

Gas Permeability

Various gas permeability coefficients of the cast film were determined at 25° C. with a gas permeability meter manufactured by Rika Seiki Kogyo K.K.

TABLE 1

|  | $H_2$ | $O_2$ | $N_2$ | $CO_2$ | $CH_4$ | $\rho(O_2)/\rho(N_2)$ |
|---|---|---|---|---|---|---|
| Example 1 | 230 | 99 | 30 | 430 | 87 | 3.3 |
| Example 2 | 430 | 290 | 93 | 910 | 260 | 2.6 |
| Example 3 | 300 | 180 | 65 | 720 | 130 | 2.4 |
| Comparative Example 1 | 21 | 2.8 | 1.5 | 15 | 2.5 | 1.9 |

* unit of coefficient: $1 \times 10^{-10}$ cm$^3$(STP)cm/(cm$^2$)(sec)(cmHg)

As shown in Table 1, the films composed of the polymer of the present invention had higher gas permeability and selectivity of oxygen gas over nitrogen gas than the film of the comparative example 1. The films of the present invention were mechanically strong enough for handling. The polymer of the present invention is therefore promising material for an oxygen enrichment membrane of air conditioners or fuel cells, and for contact lenses.

The invention claimed is:

1. A polymer having a number average molecular weight (Mn) of from 10,000 to 5,000,000, as determined by gel permeation chromatography and reduced to polystyrene, and repeating units represented by the following formula (1):

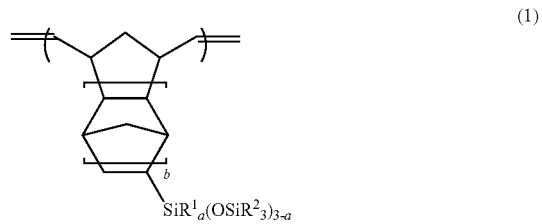

(1)

wherein $R^1$ and $R^2$ may be the same with or different from each other and are substituted or unsubstituted alkyl groups having 1 to 12 carbon atoms, a is a number of 0, 1, or a mixture thereof, and b is a number of 0, 1, 2, or a mixture thereof.

2. The polymer according to claim 1, wherein the polymer further has repeating units represented by the following formula (2):

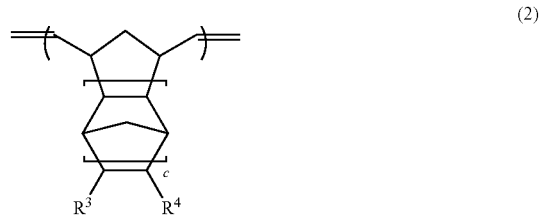

(2)

wherein $R^3$ and $R^4$ may be the same with or different from each other and are hydrogen atoms or monovalent organic groups, c is a number of 0, 1, 2 or a mixture thereof.

3. The polymer according to claim 1, wherein $R^1$ and $R^2$ are methyl groups and a is 1.

4. The polymer according to claim 1, wherein $R^1$ and $R^2$ are methyl groups and a is 0.

5. The polymer according to claim 2, wherein $R^3$ and $R^4$ are hydrogen atoms and c is 0.

6. The polymer according to any one of claims 1 to 5, wherein the polymer has a number average molecular weight (Mn), reduced to polystyrene, of from 50,000 to 500,000 and a dispersion (Mw/Mn) of from 2 to 4.

* * * * *